(12) United States Patent
Gomez Vinagre et al.

(10) Patent No.: US 10,808,691 B2
(45) Date of Patent: Oct. 20, 2020

(54) AIR FLOW CONTROL DEVICE

(71) Applicant: Descansare Sleep Lab, S.L., Logroño (ES)

(72) Inventors: Ignacio Gomez Vinagre, Logroño (ES); Oscar Valdemoros Tobia, Logroño (ES); Javier Fernandez Lopez, Logroño (ES)

(73) Assignee: Descansare Sleep Lab, S.L., Logroño (ES)

( * ) Notice: Subject to any disclaimer, the term of this patent is extended or adjusted under 35 U.S.C. 154(b) by 0 days.

(21) Appl. No.: 16/095,720

(22) PCT Filed: Apr. 18, 2017

(86) PCT No.: PCT/ES2017/070240
§ 371 (c)(1),
(2) Date: Oct. 23, 2018

(87) PCT Pub. No.: WO2017/186989
PCT Pub. Date: Nov. 2, 2017

(65) Prior Publication Data
US 2019/0170136 A1    Jun. 6, 2019

(30) Foreign Application Priority Data
Apr. 27, 2016   (ES) ................. 201630522 U

(51) Int. Cl.
| | |
|---|---|
| *F16K 15/20* | (2006.01) |
| *F04B 49/06* | (2006.01) |
| *A47C 27/08* | (2006.01) |
| *G05D 16/20* | (2006.01) |
| *F16K 31/00* | (2006.01) |

(Continued)

(52) U.S. Cl.
CPC ............. *F04B 49/06* (2013.01); *A47C 27/08* (2013.01); *F04B 49/08* (2013.01); *F04D 27/00* (2013.01); *F16K 31/00* (2013.01); *G05D 16/206* (2013.01); *F04B 9/14* (2013.01); *F04D 29/083* (2013.01); *Y10T 137/3584* (2015.04)

(58) Field of Classification Search
CPC ... Y10T 137/358436; Y10T 137/87772; Y10T 137/87877
USPC ................. 5/710, 713; 251/129.15–129.22
See application file for complete search history.

(56) References Cited

U.S. PATENT DOCUMENTS

| | | | |
|---|---|---|---|
| 5,904,172 A | 5/1999 | Gifft et al. | |
| 6,202,672 B1 * | 3/2001 | Ellis | A47C 27/082 |
| | | | 137/223 |

(Continued)

*Primary Examiner* — Robert K Arundale
(74) *Attorney, Agent, or Firm* — Wiggin and Dana LLP; Gregory S. Rosenblatt; Thomas M. Landman

(57) ABSTRACT

The invention relates to an air flow control device for inflatable objects (20) comprising a hermetic air chamber (10) arranged for being connected to an air pump (12); a printed circuit board (22A, 22B) that can be connected to a power source, the printed circuit board (22A, 22B) forming a surface limiting a face of the hermetic air chamber (10) and having at least one hole (26). The device also comprises at least one solenoid valve (14) connected on the printed circuit board (22A, 22B), covering the hole (26), and the solenoid valve comprising: a casing (28); an outer coil (30); a fixed inner metal cylinder (32); a nozzle (18) for connecting the inside of the solenoid valve (14) to the inflatable object (20); a rod (16) having a rubber tip and a spring.

11 Claims, 6 Drawing Sheets

(51) Int. Cl.
*F04D 27/00* (2006.01)
*F04B 49/08* (2006.01)
*F04B 9/14* (2006.01)
*F04D 29/08* (2006.01)

(56) References Cited

U.S. PATENT DOCUMENTS

| | | | |
|---|---|---|---|
| 10,448,749 B2* | 10/2019 | Palashewski | G05B 15/02 |
| 2003/0208847 A1* | 11/2003 | Vrzalik | A61G 7/015 |
| | | | 5/713 |
| 2005/0047923 A1* | 3/2005 | Li | A47C 27/082 |
| | | | 417/44.9 |
| 2005/0194052 A1 | 9/2005 | Gandrud | |
| 2005/0263196 A1* | 12/2005 | Hsieh | F17D 1/04 |
| | | | 137/883 |
| 2005/0269537 A1* | 12/2005 | Kung | B60R 21/017 |
| | | | 251/129.09 |
| 2006/0261916 A1* | 11/2006 | Molyneux | H01H 50/023 |
| | | | 335/128 |
| 2008/0181795 A1* | 7/2008 | Feingold | A47C 27/082 |
| | | | 417/282 |
| 2011/0095216 A1* | 4/2011 | deGreef | A61G 7/05776 |
| | | | 251/129.15 |
| 2011/0265898 A1* | 11/2011 | Driscoll, Jr. | A47C 27/082 |
| | | | 137/565.16 |
| 2012/0097282 A1* | 4/2012 | Coombs | F15B 13/0814 |
| | | | 137/861 |
| 2014/0150912 A1* | 6/2014 | Kuhbauch | F15B 13/0857 |
| | | | 137/884 |
| 2014/0202557 A1* | 7/2014 | Bullin | A61G 7/05776 |
| | | | 137/224 |
| 2016/0022520 A1* | 1/2016 | Streeter | A47C 27/082 |
| | | | 5/655.3 |
| 2019/0142180 A1* | 5/2019 | Huang | A47C 27/084 |
| | | | 5/710 |

\* cited by examiner (Perspective view)

(Exploded view)

AIR FLOW CONTROL DEVICE

FIELD OF THE INVENTION

The present invention relates to the field of inflatable objects, more specifically to devices for inflating said objects, and more specifically to a control device for controlling air flow for inflating and/or deflating said inflatable objects.

BACKGROUND OF THE INVENTION

Inflatable objects are widely used in many fields of the art, for example, in the field of bases such as mattresses, mats, pillows, sofas, etc., on which one rests. Such objects can be inflated by means of hand or electric pumps. Hand pumps may require a lot of the user's time and effort depending on the size of the object and on the level of pressure the user wants to provide to it.

Electric pumps make inflating/deflating said objects significantly easier compared to hand pumps, but it does not provide a suitable level of control over the inflation of said objects. The user must stay close to the air pump and deactivate it when he/she deems that the object has been inflated sufficiently. This operation generally requires several adjustments by the user until a level of inflation pressure which is comfortable for the user is achieved.

Furthermore, there are inflatable objects, for example mattresses, that comprise several areas that must be inflated separately. Therefore, the user must couple the air pump to an area of the inflatable object and activate said pump until achieving desired a level of inflation. Then, the user must disconnect the air pump from said area and repeat the operation for each of the independent areas of the object. This task requires a lot of time and may be bothersome for the user.

Therefore, it would be desirable to have a device controlling the inflation air flow between an air pump and an inflatable object which solves or at least provides a reliable, comfortable, and easy-to-use alternative to electric pumps commonly used in the art.

SUMMARY OF THE INVENTION

To solve the aforementioned drawbacks, the present invention discloses an air flow control device comprising:
a hermetic air chamber arranged for being connected to an air pump;
a printed circuit board that can be connected to a power source, the printed circuit board forming a surface limiting a face of the hermetic air chamber and having at least one hole;
at least one solenoid valve connected on the printed circuit board, each of the at least one solenoid valve covering one of the at least one hole, wherein each solenoid valve comprises:
a casing;
an outer coil;
a fixed inner metal cylinder;
a nozzle for connecting the inside of the solenoid valve with an inflatable object; and
a rod having a rubber tip and a spring, the rod being able to move inside the inner metal cylinder between an extended position for blocking the corresponding hole and a contracted position in which communication between the inside of the solenoid valve and the air chamber through the corresponding hole is allowed.

The air pump is thereby connected, through the hermetic air chamber and the solenoid valve, to the object to be inflated. Said connection can be interrupted when the rod of the solenoid valve is in the extended position, blocking the corresponding hole by means of its rubber tip, such that inflation of the inflatable object is stopped without having to stop the air pump or disconnect the inflatable object from the solenoid valve.

The rod is moved between the extended and contracted positions by means of the application of a differential voltage on the coil through the printed circuit board.

BRIEF DESCRIPTION OF THE DRAWINGS

The present invention will be better understood in reference to the following drawings illustrating preferred embodiments of the invention that are provided by way of example and must not be interpreted as limiting the invention in any way.

DETAILED DESCRIPTION OF THE PREFERRED EMBODIMENTS

Figure 1:
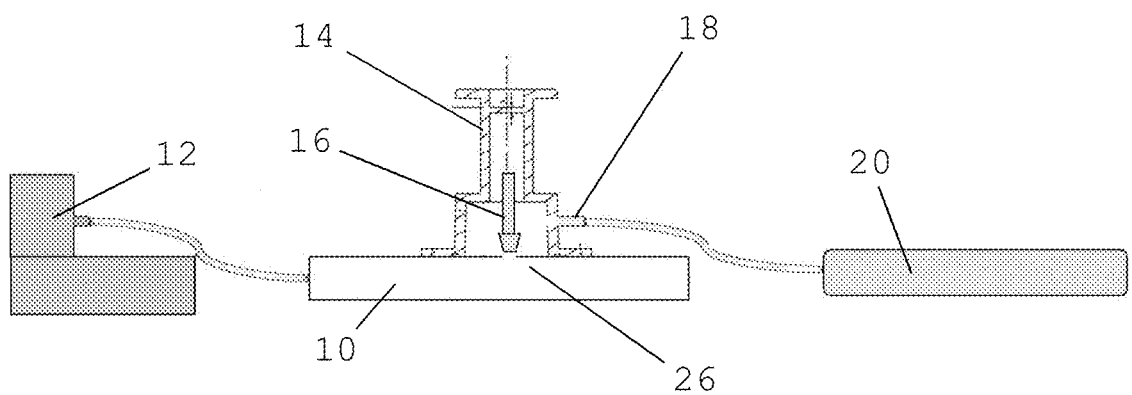
FIG. 1 is a general diagram of the flow control device according to the present invention, arranged between an air pump and an inflatable object.

FIG. 1 shows a general diagram of a flow control device according to the present invention in which the operation thereof is shown in a highly schematic manner. As can be seen, the device comprises an air chamber (10) which can be connected to an external air pump (12). Although not shown in detail in FIG. 1, the upper face of the air chamber (10) is formed by a printed circuit board that can be connected to a power source. Furthermore, the printed circuit board has a hole (26) on which a solenoid valve (14) is installed. The solenoid valve (14) comprises, among other elements not shown in this figure, a rod (16) which can move inside the solenoid valve (14) between two positions. In a first extended position, the rod (16) blocks the hole (26) of the air chamber (10), whereas in a second contracted position, it allows communication between the inside of the solenoid valve (14) and the air chamber (10) through said hole (26).

The solenoid valve (14) also comprises a nozzle (18) for connecting the inside of the solenoid valve (14) with an inflatable object (20).

The air pump (12) is thereby connected to the inflatable object (20) through the hermetic air chamber (10) and the inside of the solenoid valve (14). Said communication between the air pump (12) and the inflatable object (20) can be interrupted by means of the rod (16) of the solenoid valve (14) blocking the hole (26) of the air chamber (10).

Figure 2B:
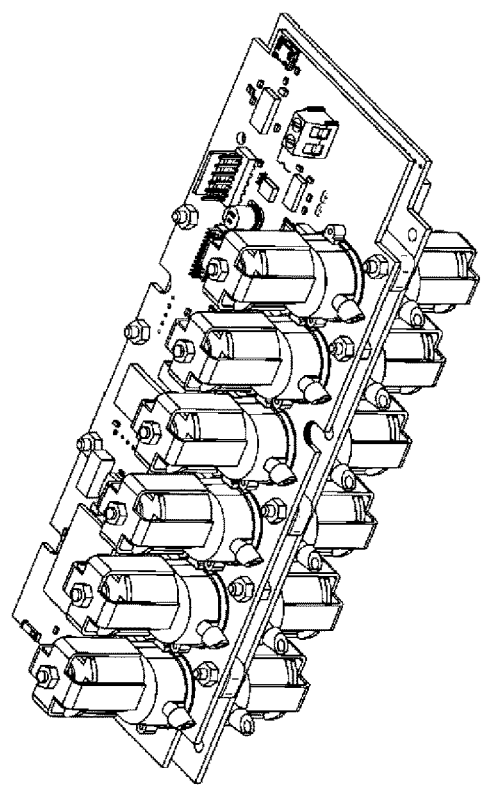
FIG. 2B is a perspective view of the flow control device of FIG. 2A.
Figure 2A:
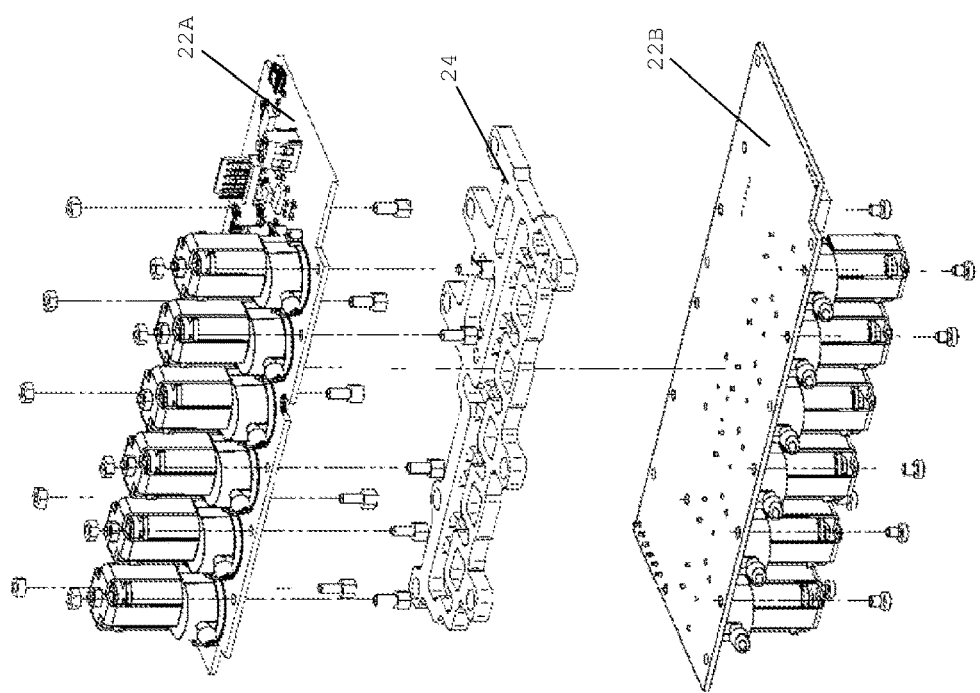
FIG. 2A is an exploded view of a flow control device according to a preferred embodiment of the present invention.

FIG. 2A more clearly shows a preferred embodiment of the flow control device of the present invention. As can be seen, the device comprises an air chamber limited in this case by an upper printed circuit board (22A), a lower printed circuit board (22B), and a perimetral attachment part (24) between both printed circuit boards (22A, 22B). Each printed circuit board (22A, 22B) has a plurality of holes (26) (not shown in this figure).

The device further comprises a plurality of solenoid valves (14) connected in series on said plurality of respective holes (26) in each of the printed circuit boards (22A, 22B).

The flow control device therefore has a compact configuration which allows simultaneously controlling a plurality of inflatable objects (or independent inflatable areas of one and the same object) by means of the plurality of solenoid valves (14). For example, the inflation/deflation of a mattress and an associated pillow, as well as the inflation/deflation of multiple independent inflation areas making up a single inflatable mattress, can be simultaneously controlled by means of this device.

Figure 3:
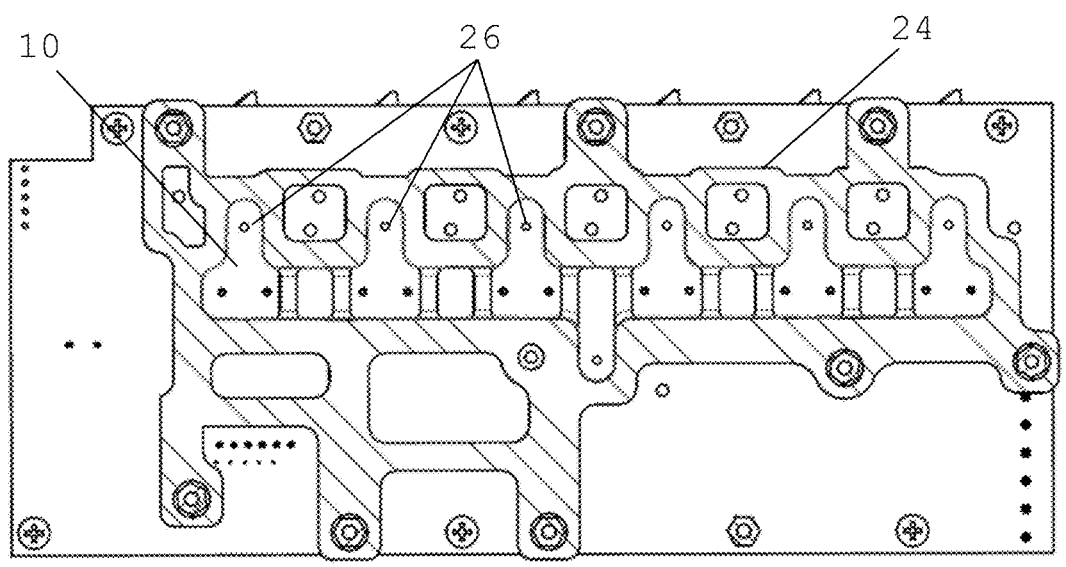
FIG. 3 is a longitudinal section view of the device of FIGS. 2A and 2B.

The shape of the hermetic air chamber (10) to which the various solenoid valves (14) are connected through the corresponding holes (26) can be seen in FIG. 3.

Figure 4:
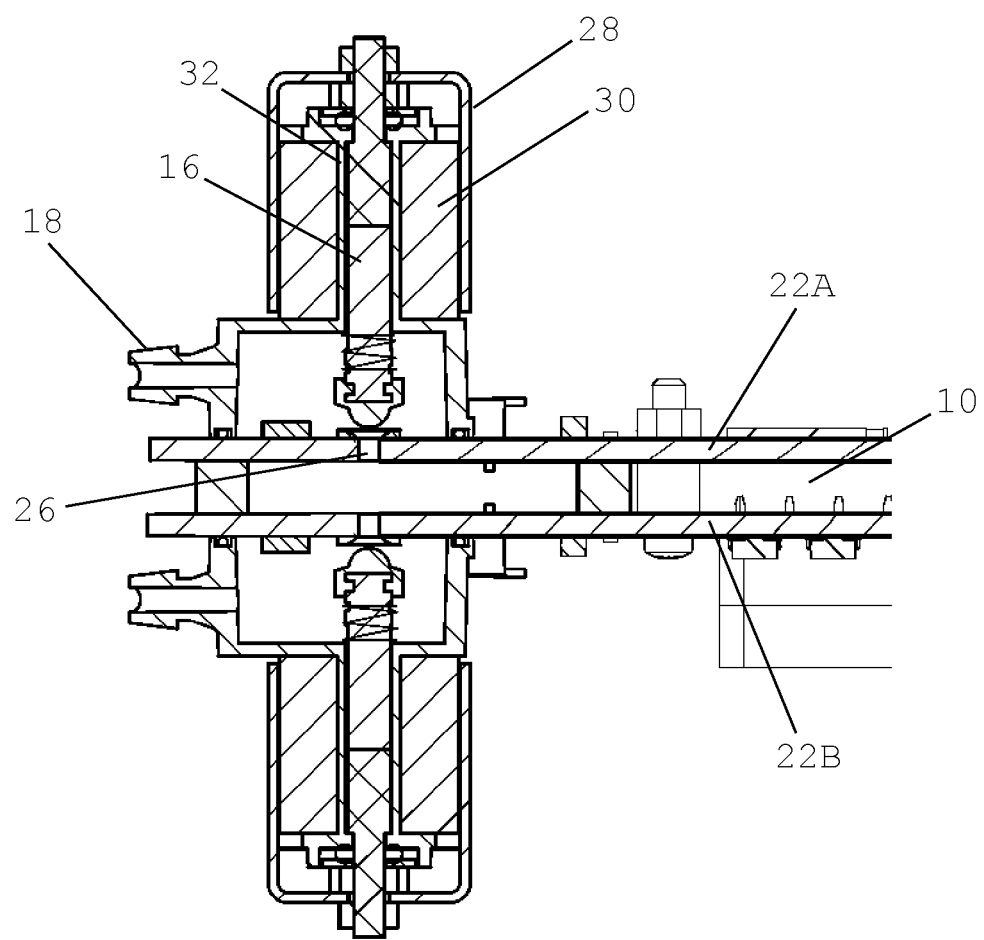
FIG. 4 is a cross-section view of a detail of the device of FIGS. 2A and 2B showing the inside of a solenoid valve.

A detail of the solenoid valve (14) of the flow control device can be seen in FIG. 4. The solenoid valve (14) comprises a casing (28), an outer coil (30), a fixed inner metal cylinder (32), a nozzle (18), and a rod (16). The nozzle (18) allows connecting the inflatable object (20) with the inside of the solenoid valve (14), and therefore with the air chamber (10) and the air pump (12) through the hole (26).

The rod (16) has a rubber tip and a spring. The rubber tip allows a suitable coupling between the rod and its corresponding hole (26), which has a favorable influence on the hermetic blocking of said hole. Furthermore, the rubber tip prevents wear and damage to both the rod (16) and the corresponding printed circuit board (22A, 22B) by means of friction between both elements in the extended position of the rod (16). The spring pushes the rod (16) to the extended position in the absence of a magnetic field, as will be explained below.

The rod (16) can therefore move inside the inner metal cylinder (32) between an extended position for blocking the corresponding hole (26) and a contracted position in which communication between the inside of the solenoid valve (14) and the air chamber (10) through the corresponding hole (26) is allowed.

The rod (16) is moved between the extended and contracted positions by means of the application of a differential voltage on the coil (30) through the printed circuit board (22A, 22B), such that said differential voltage creates a magnetic field in the coil (30) which attracts the rod (16) to its contracted position. In the absence of said magnetic field, the spring pushes the rod (16) to its extended position for blocking the hole (26).

The air flow can run in either direction between the air pump (12) and the inflatable object (20), therefore the flow control device can be used for both inflating and deflating the inflatable object (20) connected to the nozzle (18). Furthermore, when the rod (16) is in its extended position for blocking the hole (26), maintaining a specific level of pressure in a hermetic manner inside the inflatable object (20) is allowed.

To make it easier to connect the air pump (12) and the air chamber (10), according to an embodiment of the invention the device comprises a hollow element (not shown) connected on a hole (26) made in one of the printed circuit boards (22A, 22B), said hole (26) therefore allowing a permanent connection between the air chamber (10) and the air pump (12).

Figure 5:
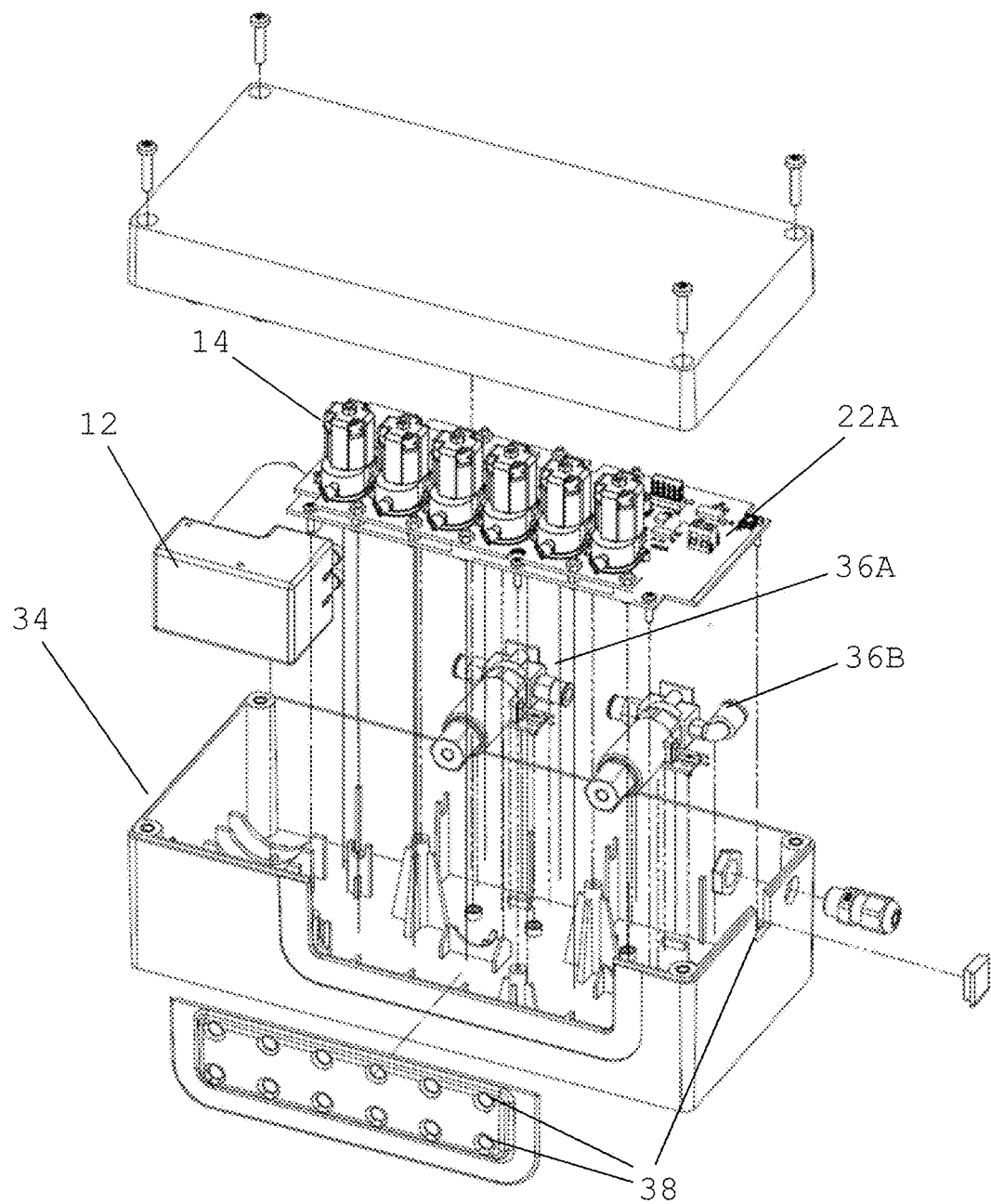
FIG. 5 is an exploded view of a flow control device according to another preferred embodiment of the present invention.

FIG. 5 shows an exploded view of a second preferred embodiment of the flow control device. In this case, the device comprises an outer casing (34) inside which all the components of the device are housed and therefore protected. The outer casing (34) has holes (38) envisaged for the connection of each solenoid valve (14) with an external inflatable object (20), as well as for the insertion of an electric cable for connecting each printed circuit board (22A, 22B) with an external power source, such as a general power socket or a socket of a vehicle.

The assembly formed by the printed circuit boards (22A, 22B) and the attachment part (24) (forming the air chamber (10)), as well as by the solenoid valves (14) is similar to the one described above in reference to FIGS. 2A, 2B, 3, and 4, and therefore those elements will not be described herein again.

In this case, instead of being connected to an air pump (12) independent of the device, the device further comprises an air pump (12) included inside the outer casing (34). It further comprises a first external solenoid valve (36A) connected to the outlet of the air pump (12) and a second external solenoid valve (36B) connected to the inlet of the air pump (12), as will be additionally described hereinbelow. The external solenoid valves (36A, 36B) are bidirectional solenoid valves, i.e., each port can act both as an inlet and as an outlet, such that they allow controlling both inflation and deflation of the inflatable object (20).

Figure 6A:
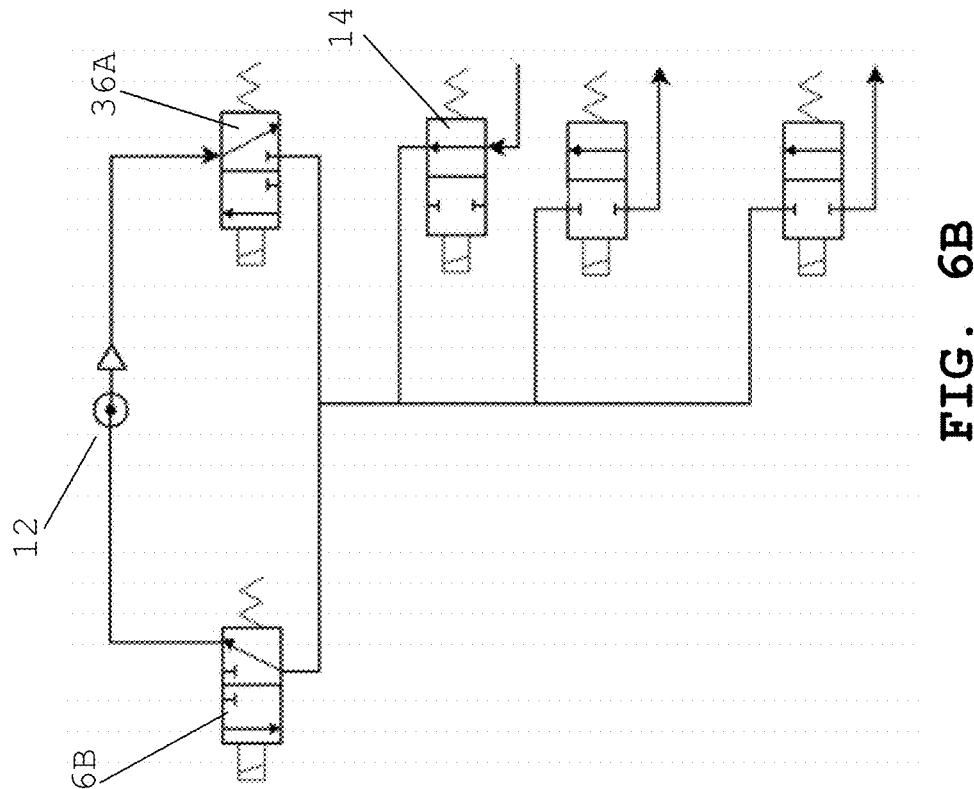
FIGS. 6A and 6B are diagrams of the pneumatic circuit of the flow control device of FIG. 5, in the mode of inflating (FIG. 6A) and deflating (FIG. 6B) an inflatable object.
Figure 6B:
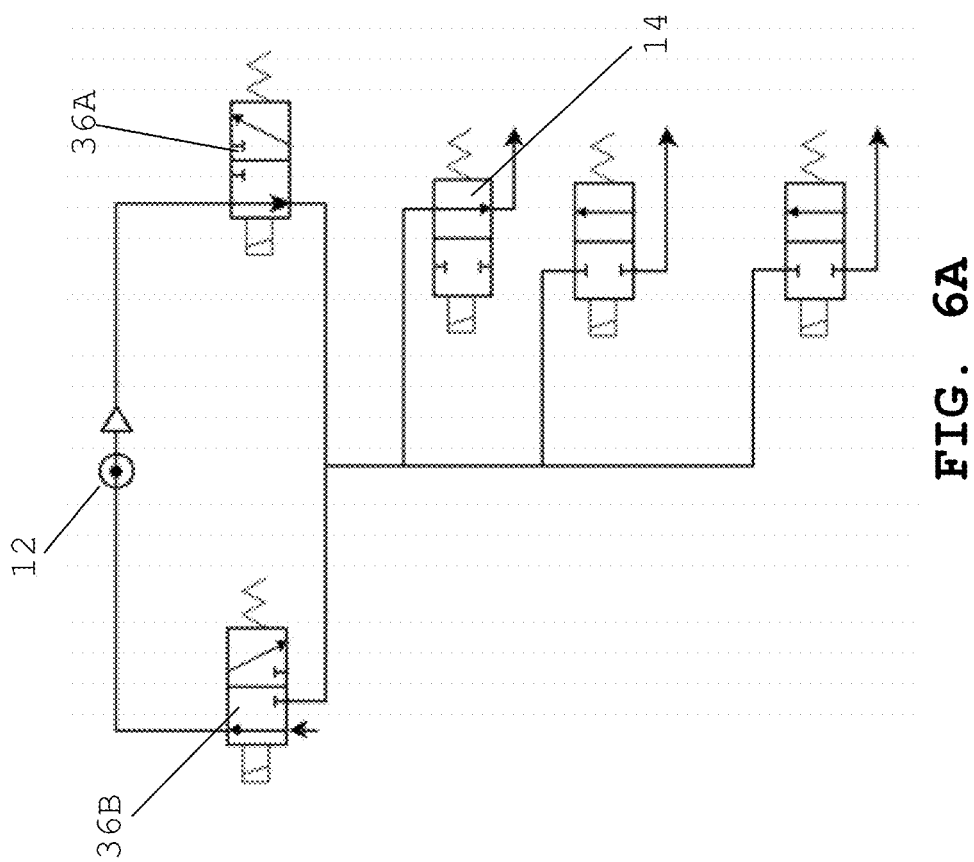

The operation of the flow control device shown in FIG. 5 can be more clearly seen in FIGS. 6A and 6B. The air pump (12) and the external solenoid valves (36A, 36B) are connected in a pneumatic circuit through several air conduits. The air conduit communicating the two external solenoid valves (36A, 36B) with one another is furthermore communicated, by means of a T-shaped part, with the air chamber (10) described above.

FIG. 6A depicts a mode of inflating of an inflatable object (20). In this case, the air pump (12) takes in air through external solenoid valve (36B) and delivers it to external solenoid valve (36A). The air cannot continue again through the external solenoid valve (36B) and therefore moves forward to the air chamber (10) through the T-shaped part mentioned above. From the air chamber (10), the air that has been introduced therein is directed to the inflatable object (20) through the corresponding solenoid valve (14) as described hereinabove.

In FIG. 6B the direction of operation of the external solenoid valves (36A, 36B) is changed, such that the air pump (12) extracts air from the object (20) through the solenoid valve (14), the air chamber (10), and the external solenoid valve (36B). The air pump (12) expels said extracted air through the conduits of the pneumatic circuit to the outside through the solenoid valve (36A).

According to an additional embodiment not shown in the drawings, the flow control device further comprises a pressure sensor located inside each solenoid valve connected on the printed circuit board. This sensor measures the pressure inside the corresponding solenoid valve, and therefore inside the inflatable object connected thereto. Furthermore, the device may comprise either internal control means (for example, a programmable logic together with a suitable user interface such as push buttons, a touch screen, etc.) or means for communication (either wired or wirelessly, such as by means of WiFi, Bluetooth, radiofrequency, etc.) with external control means (for example, a computer, smartphone, tablet, etc.). The (internal or external) control means allows the user to easily and precisely control the operation of the control device (i.e., of the air pump and of each of the solenoid valves) depending on the pressure detected by each of the pressure sensors. Specifically, the user can enter, for example, a reference pressure value such that the control device controls the operation of the air pump (activation/deactivation, etc.) and/or of the corresponding solenoid valves (opening/closing, time, etc.) depending on the reference value entered and on the pressure detected by the sensors, such that the pressure in the inflatable object is kept at the same reference value entered by the user.

Therefore, the flow control device according to the preferred embodiment described above has various applications. For example, the device can be applied to the production of mattresses, pillows, etc. in which the level of support and/or comfort can be adjusted individually by means of independent inflatable areas, using a single air pump to inflate all the inflatable areas.

Furthermore, in the case of the flow control device which incorporates pressure sensors inside each solenoid valve as described above, the study of the changes in pressure exerted in each of the inflatable areas is allowed for developing algorithms to determine movements, posture changes, and even respiration and heart rate.

Additionally, in this last case the flow control device can also be applied to measurement/diagnosis and even simulation. In other words, the device allows determining the pressure exerted by a body on a rest surface and constructing, with said information, algorithms that allow simulating the ideal resting unit for said body, adapting the inflatable areas to specific levels of firmness. This allows subsequently producing a resting unit custom-made for said body that is based on foams, springs, or any other material having different firmnesses and/or levels of support.

Although the present invention has been described in reference to preferred embodiments thereof, changes and modifications will occur to one skilled in the art without departing from the scope of the attached claims. For example, although it has been described that an embodiment of the invention includes a single solenoid valve, and that an embodiment includes two printed circuit boards with a plurality of solenoid valves connected on each of them, it will be obvious that the invention also covers flow control devices comprising a plurality of solenoid valves connected in series on a corresponding plurality of respective holes in a single printed circuit board.

Another embodiment of the invention envisages a device comprising an air pump which allows inverting the polarity thereof such that the control device can be operated for inflating and deflating the inflatable object without having to use the external solenoid valves described above.

Although the connection of the flow control device to an external power source has been mentioned above, the incorporation of a battery, which can be a rechargeable battery, as an internal power source which is part the control device itself can also be envisaged in addition or as an alternative to the connection with an external power source.

The invention claimed is:
1. An air flow control device, said device comprising:
a hermetic air chamber arranged for being connected to an air pump;
a printed circuit board, the printed circuit board forming a surface limiting a face of the hermetic air chamber and having at least one hole;
at least one solenoid valve connected on the printed circuit board each of the at least one solenoid valve covering one of the at least one hole, wherein each solenoid valve comprises:
a casing;
an outer coil;
a fixed inner metal cylinder;
a nozzle for connecting the inside of the solenoid valve with an inflatable object; and
a rod being able to move inside the inner metal cylinder between an extended position for blocking the corresponding hole and a contracted position in which communication between the inside of the solenoid valve and the air chamber through the corresponding hole is allowed;
such that the rod is moved between the extended and contracted positions by means of the application of a differential voltage on the coil through the printed circuit board, thereby controlling the air flow between the air pump and the inflatable object.

2. The air flow control device according to claim 1, further comprising a plurality of solenoid valves on a corresponding plurality of respective holes in the printed circuit board.

3. The air flow control device according to claim 1, wherein the hermetic air chamber is limited by two of the printed circuit boards, disposed apart as upper and lower printed circuit boards, and a perimetral attachment part between the two printed circuit boards, each printed circuit board having a plurality of holes, and further comprising a plurality of solenoid valves on a corresponding plurality of respective holes in each of the printed circuit boards.

4. The air flow control device according to claim 1, further comprising an air pump connected to the hermetic air chamber.

5. The air flow control device according to claim 4, wherein the air pump allows inverting the polarity thereof such that it is operated for inflating and deflating the inflatable object.

6. The air flow control device according to claim 4, further comprising a first external solenoid valve connected to an outlet of the air pump and a second external solenoid valve connected to an inlet of the air pump, such that the device controls the inflation and the deflation of the inflatable object without changing the polarity of the air pump.

7. The air flow control device according claim 1, further comprising a pressure sensor inside each solenoid valve connected on the printed circuit board for measuring the pressure in the inflatable object connected thereto.

8. The air flow control device according to claim 7, it further comprising control means for controlling the operation of the air pump and of each of the solenoid valves depending on the pressure detected by each of the pressure sensors.

9. The air flow control device according to claim 7, further comprising means for communication with external control means for controlling the operation of the air pump and of each of the solenoid valves depending on the pressure detected by each of the pressure sensors.

10. The air flow control device according to claim 1 further comprising an outer casing.

11. The air flow control device according to claim 1, wherein the rod has a rubber tip and a spring.

* * * * *